(12) United States Patent
Baudson et al.

(10) Patent No.: US 11,345,484 B2
(45) Date of Patent: May 31, 2022

(54) DISPLAY SYSTEM OF AN AIRCRAFT, ABLE TO DISPLAY A LOCALIZATION MARKING OF A ZONE OF LOCATION OF AN APPROACH LIGHT RAMP AND RELATED METHOD

(71) Applicant: DASSAULT AVIATION, Paris (FR)

(72) Inventors: Olivier Baudson, Suresnes (FR); Arnaud Turpin, Boulogne Billancourt (FR)

(73) Assignee: DASSAULT AVIATION, Paris (FR)

( * ) Notice: Subject to any disclaimer, the term of this patent is extended or adjusted under 35 U.S.C. 154(b) by 499 days.

(21) Appl. No.: 15/189,897

(22) Filed: Jun. 22, 2016

(65) Prior Publication Data
US 2016/0376026 A1    Dec. 29, 2016

(30) Foreign Application Priority Data

Jun. 24, 2015 (FR) ..................... 15 01311

(51) Int. Cl.
*B64D 45/08* (2006.01)
*G09G 3/00* (2006.01)
(Continued)

(52) U.S. Cl.
CPC ............. *B64D 45/08* (2013.01); *B64D 43/00* (2013.01); *G01C 23/00* (2013.01); *G02B 27/0101* (2013.01); *G02B 27/0172* (2013.01); *G08G 5/0021* (2013.01); *G08G 5/025* (2013.01); *G09G 3/002* (2013.01); *B64D 5/00* (2013.01); *B64F 1/18* (2013.01); *G02B 2027/014* (2013.01);
(Continued)

(58) Field of Classification Search
CPC ........ B64D 45/08; B64D 45/00; B64D 43/00; G02B 27/0101; G02B 27/0172; G02B 2027/014; G02B 2027/0141; G09G 3/002; G09G 2380/12; G08G 5/025; G08G 5/065; G08G 5/0021; B64F 1/18; G01C 23/00
See application file for complete search history.

(56) References Cited

U.S. PATENT DOCUMENTS 4,210,930 A   7/1980 Henry
7,965,223 B1*  6/2011 McCusker ............ G01S 13/913
                                              340/961
(Continued)

FOREIGN PATENT DOCUMENTS

EP   2317488 A2   5/2011
EP   2492890 A2   8/2013
(Continued)

OTHER PUBLICATIONS

French Search Report for priority application FR 15 01311.

*Primary Examiner* — William Boddie
*Assistant Examiner* — Saifeldin E Elnafia
(74) *Attorney, Agent, or Firm* — Davidson, Davidson & Kappel, LLC (57) ABSTRACT

A display system of an aircraft, able to display a localization marking of a zone of location of an approach light ramp and related method are provided. The display system includes a display unit and an assembly generating a display on the display unit. The display generator is able to display, on approach to a landing strip, a localization marking of a presence zone of an approach light ramp toward the landing strip.

19 Claims, 6 Drawing Sheets

(51) Int. Cl.
*G08G 5/00* (2006.01)
*G08G 5/02* (2006.01)
*G01C 23/00* (2006.01)
*B64D 43/00* (2006.01)
*G02B 27/01* (2006.01)
*B64D 5/00* (2006.01)
*B64F 1/18* (2006.01)
*G08G 5/06* (2006.01)

(52) U.S. Cl.
CPC ..... *G02B 2027/0141* (2013.01); *G08G 5/065* (2013.01); *G09G 2380/12* (2013.01)

(56) References Cited

U.S. PATENT DOCUMENTS

| | | |
|---|---|---|
| 8,249,806 B1 | 8/2012 | McCusker |
| 8,917,191 B1 | 12/2014 | Tiana et al. |
| 2002/0099528 A1 | 7/2002 | Hett |
| 2012/0215388 A1* | 8/2012 | Pepitone ............. G08G 5/0021 701/14 |
| 2014/0097973 A1* | 4/2014 | Baudson ............. G06T 19/006 340/972 |
| 2014/0100721 A1 | 4/2014 | Baudson |
| 2015/0002316 A1 | 1/2015 | Sridhar et al. |

FOREIGN PATENT DOCUMENTS

| | | |
|---|---|---|
| EP | 2717229 A1 | 4/2014 |
| EP | 2717230 A1 | 4/2014 |
| EP | 3079138 A2 | 10/2016 |

* cited by examiner

DISPLAY SYSTEM OF AN AIRCRAFT, ABLE TO DISPLAY A LOCALIZATION MARKING OF A ZONE OF LOCATION OF AN APPROACH LIGHT RAMP AND RELATED METHOD

This claims the benefit of French Patent Application FR 15 01311, filed Jun. 24, 2015 and hereby incorporated by reference herein.

The present invention relates to a display system of an aircraft, comprising:
a display unit;
an assembly generating a display on the display unit.

Such a system is designed to be installed in the cockpit of an aircraft to be associated with a display unit of the cockpit. The display unit is for example an at least partially transparent display unit, such as a semitransparent screen placed in front of a windshield of the cockpit, a system for projecting images on the windshield of the cockpit, a semitransparent sunshade, a helmet visor, or a semitransparent glass close to the eye.

Alternatively, the display unit constitutes a head down monitor integrated into the dashboard of the cockpit.

The display system is intended to facilitate the piloting of the aircraft during landing under conditions with little or no visibility.

BACKGROUND

Under such conditions, guidance systems allow the pilot to come as close as possible to the landing strip. Nevertheless, landing is only possible when the pilot actually sees the runway.

In all cases, at the end of approach, the pilot visually seeks to identify the position of the landing strip, in order to decide to land, or on the contrary to perform a go-around maneuver.

To facilitate the identification of the runway threshold under low visibility conditions, modern airfields are equipped with approach light ramps, situated longitudinally in front of the runway threshold.

These ramps generally comprise at least one longitudinal row of lights aligned along the runway axis, and perpendicular to the longitudinal row, at least one transverse row of lights intersecting the longitudinal row.

SUMMARY OF THE INVENTION

On an approach with low visibility, the pilot therefore seeks first to identify the presence of the approach light ramp.

This search may be tedious. The pilot must indeed repeatedly check the flight parameters to ensure that the slope and speed of the aircraft are appropriate during descent, and simultaneously locate the zone in which he expects to find a lighted ramp and determine whether he sees the ramp in that zone.

If he does not see the ramp, he must once again check the flight parameters, and again determine the potential presence of the lighted ramp. The back and forth between these various tasks periodically causes a significant workload for the crew.

One aim of the invention is therefore to have a display system that facilitates the work of the pilot in order to identify the runway when approaching under low visibility conditions.

To that end, the invention provides a system of the aforementioned type, characterized in that the display-generating assembly is able to display, on approach to a landing strip, a localization marking of a presence zone of an approach light ramp toward the landing strip.

The system according to the invention may comprise one or more of the following features, considered alone or according to any technically possible combination:
the localization marking includes at least one lateral localization symbol of the presence zone of the approach light ramp;
the localization marking includes at least two opposite lateral localization symbols of the presence zone of the approach light ramp, delimiting the presence zone of the approach light ramp to the left and right;
the localization marking includes at least one series of lateral localization symbols on one side of the presence zone of the approach light ramp, the series of lateral localization symbols converging toward a longitudinal axis of the runway;
the localization marking includes two series of lateral localization symbols respectively delimiting the left side and right side of the presence zone of the approach light ramp;
the localization marking includes at least one symbol identifying, on the display unit, a position corresponding to a predetermined distance on the ground from the runway threshold at which the approach light ramp comprises a transverse row of lights;
the predetermined distance on the ground is comprised between 275 m and 335 m;
the localization marking comprises two opposite symbols situated in a position corresponding to a predetermined distance on the ground from the runway threshold at which the approach light ramp comprises a transverse row of lights, the lateral separation between the opposite symbols corresponding to a distance on the ground strictly greater than the width of the transverse row;
the display-generating assembly is able to display a position marking of the landing strip, situated above the localization marking of the presence zone of the approach light ramp toward the landing strip;
the display-generating assembly is able to display a runway axis symbol, situated below the localization marking of the presence zone of an approach light ramp toward the landing strip;
it comprises a database of approach ramps, containing at least one piece of information characteristic of each approach ramp associated with a landing strip targeted by the aircraft, the display-generating assembly being able to create and display the localization marking by using at least one piece of information characteristic of the approach ramp approached by the aircraft contained in the database of approach ramps;
the display-generating assembly is capable of dynamically displaying, on the display unit, at least one horizon line and a slope scale relative to the horizon line;
the display-generating assembly is able to display, before the display of the localization marking of the presence zone of an approach light ramp toward the landing strip, an identification symbol of the landing strip, pointing to the position of the landing strip on the display unit;
the display unit is an at least partially transparent display unit, such as a semitransparent screen placed in front of a windshield of the cockpit, a system for projecting images on the windshield of the cockpit, a semitransparent sunshade, a helmet visor, or a semitransparent glass close to the eye;

the approach light ramp extends in front of the landing strip, in the axis thereof;

the display-generating assembly comprises a module for generating a localization marking for a presence zone of the approach light ramp toward the landing strip, the generating module being configured to calculate, in real-time, the geographical position of a geographical zone on the ground, the geographical zone containing at least 50%, preferably all of the approach light ramp;

the geographical zone has a polygon shape, in particular a trapeze shape;

the system is designed to be installed in the cockpit of an aircraft to be associated with a display unit of the cockpit;

the display-generating assembly is able to display, on approach to a landing strip, a localization marking on the display unit of a presence zone of an approach light ramp toward the landing strip;

the display-generating assembly is connected to the display unit and to a system of measuring sensors;

the measuring sensors are able to provide information on the geographical position of the aircraft, its speed, its heading and its attitude;

the display unit allows the pilot to observe, in particular by transparence, the area situated in front of the aircraft, and simultaneously, a display generated by the display-generating assembly.

The invention also provides a display method in an aircraft, comprising the following steps:

providing a system as described above;

upon approaching the landing strip, displaying, via the display-generating assembly, of a localization marking of the presence zone of the approach light ramp toward the landing strip.

BRIEF SUMMARY OF THE DRAWINGS

The invention will be better understood upon reading the following description, provided solely as an example and done in reference to the appended drawings, in which.

DETAILED DESCRIPTION

Figure 1:
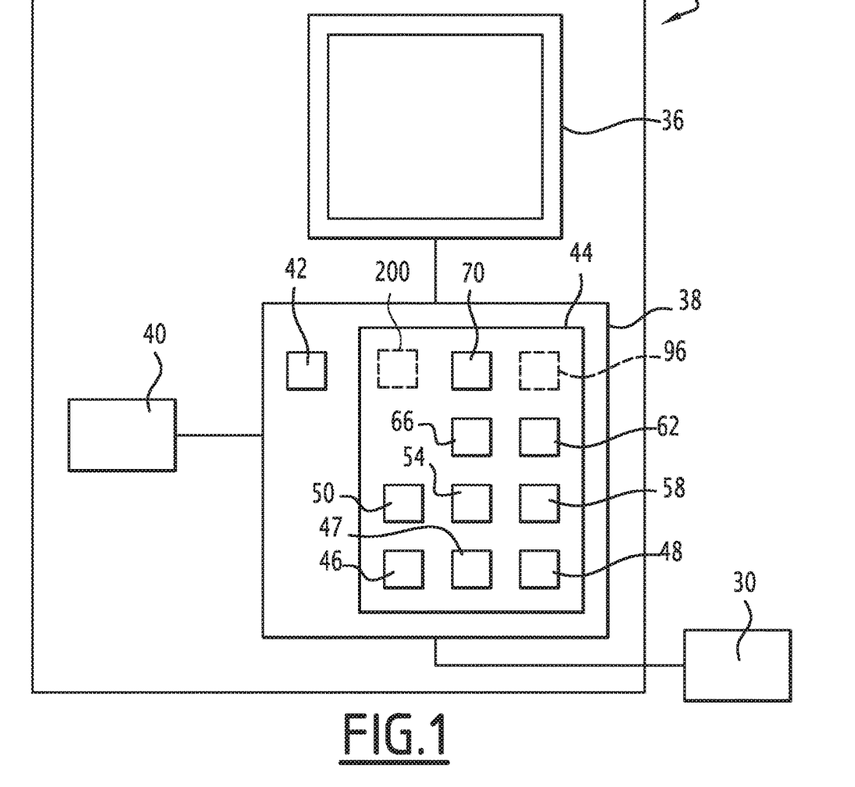
FIG. 1 is a diagrammatic view of a first display system of an aircraft according to an embodiment of the invention.
Figure 2:
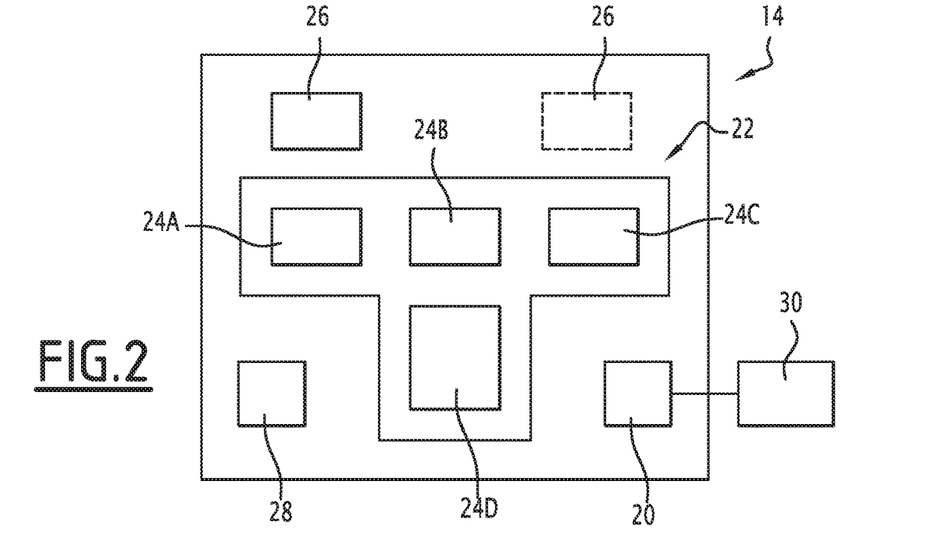
FIG. 2 diagrammatically illustrates the cockpit of an aircraft comprising the first display system.

A first display system 10 of an aircraft according to an embodiment of the invention is diagrammatically illustrated by FIGS. 1 and 2.

Figure 5:
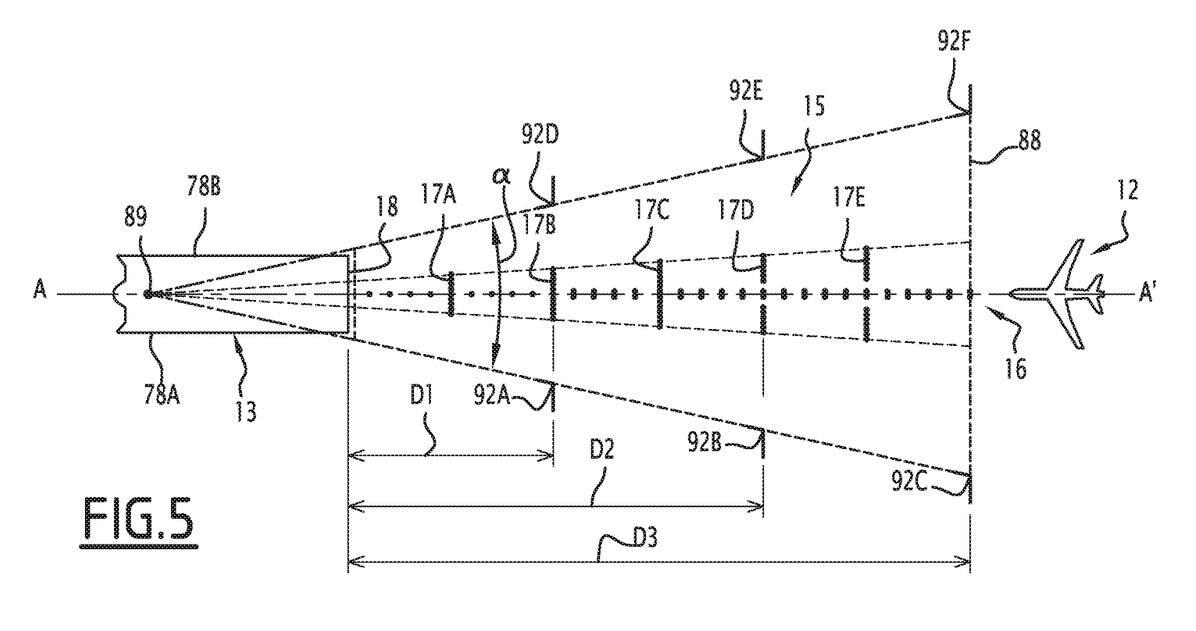
FIGS. 5 to 8 illustrate, in top view, several configurations of approach light ramps for landing strips.

The system 10 is intended to be installed in an aircraft 12, shown diagrammatically in FIG. 5, to allow the display of information on a display unit present in the cockpit 14 of the aircraft, shown diagrammatically in FIG. 2.

The system 10 is intended to assist the pilot of the aircraft 12 during an approach phase, in the vicinity of a landing strip 13, shown diagrammatically in FIG. 5.

In particular, the system 10 is intended to assist the pilot in the visual identification of an approach light ramp 15 toward the landing strip 13 from the cockpit 14, in order to decide whether to continue the landing on the landing strip 13.

More generally, in reference to FIGS. 5 to 8, the approach light ramp 15 extends in front of the landing strip 13, in the axis A-A' thereof.

It includes at least one axial row 16 of lights embodying the runway axis A-A', and at least one transverse row 17A to 17E of lights, perpendicular to the axial row 16, intersecting the axial row 16 and extending on both sides of the axial row 16.

The axial row 16 extends from the runway threshold 18, over an axial distance, taken from the runway threshold 18, greater than 426 m (1400 feet), and generally comprised between 426 m and 1067 m (3500 feet).

The transverse rows 17A to 17E are spaced longitudinally apart from one another. Preferably, at least one transverse row 17B extends transversely at a distance comprised between 274 m (900 feet) and 335 m (1100 feet) from the runway threshold 18, preferably at 300 m (1000 feet) from the runway threshold 18.

Non-exhaustive examples of common approach ramps 15 will be described successively in light of FIGS. 5 to 8.

In the example shown in FIG. 5, the width of the axial row 16, resulting from the number of lights making it up, decreases as one approaches the runway threshold 18.

In the example shown in FIG. 5, the transverse rows 17A to 17E are spaced apart longitudinally from one another by at least 150 m (500 feet).

The width of the transverse rows 17A to 17E decreases as one comes closer to the runway threshold 18.

The width of the row 17B is for example comprised between 10 m (33 feet) and 60 m (197 feet).

Figure 6:
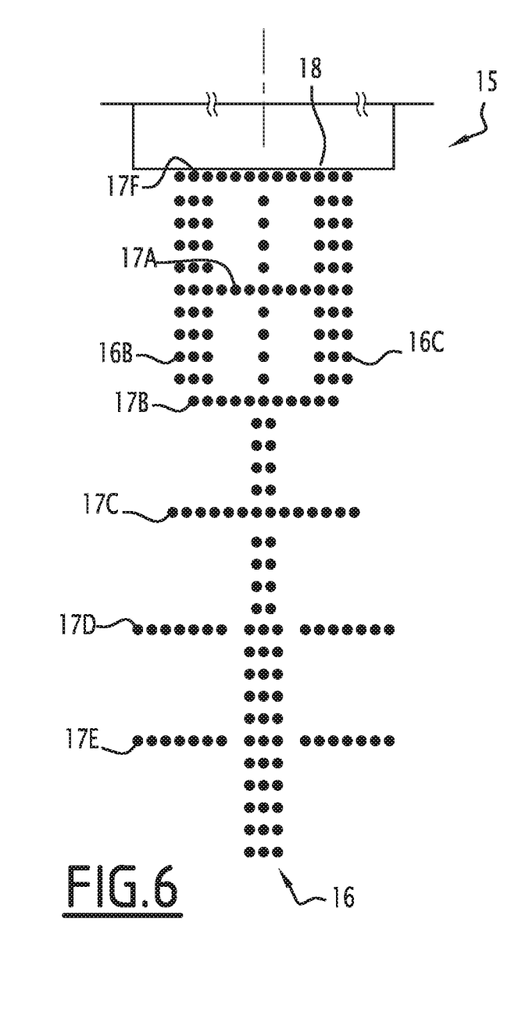

In an alternative approach light ramp 15, shown in FIG. 6, the ramp 15 includes a transverse row 17F situated at the runway threshold 18, and two longitudinal rows 16B, 16C parallel to the axial row 16, connecting the free ends of the transverse rows 17F, 17A, 17B to one another, to the left and right of the axial row 16.

As for the ramp 15 illustrated in FIG. 5, the ramp 15 shown in FIG. 6 includes a transverse row 17B that extends transversely at a distance comprised between 274 m (900 feet) and 335 m (1100 feet) from the runway threshold 18, preferably at 300 m (1000 feet) from the runway threshold 18.

Figure 7:
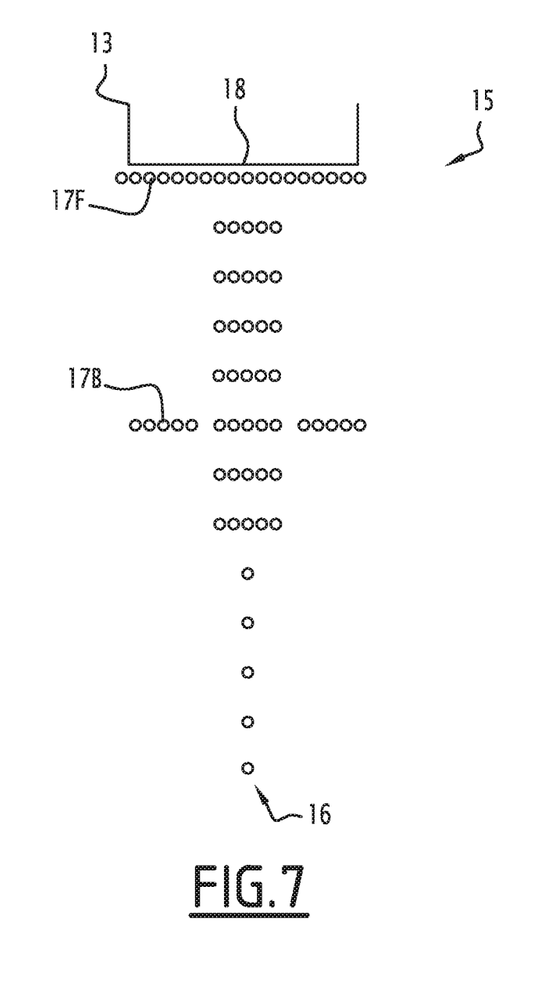

The ramp 15 shown in FIG. 7 includes an axial row 16 that becomes wider as it comes closer to the runway threshold 18. It includes a transverse row 17F situated at the runway threshold 18, and a transverse row 17B that extends transversely at a distance comprised between 274 m (900 feet) and 335 m (1100 feet) from the runway threshold 18, preferably at 300 m (1000 feet) from the runway threshold 18.

It does not include other transverse rows.

Figure 8:
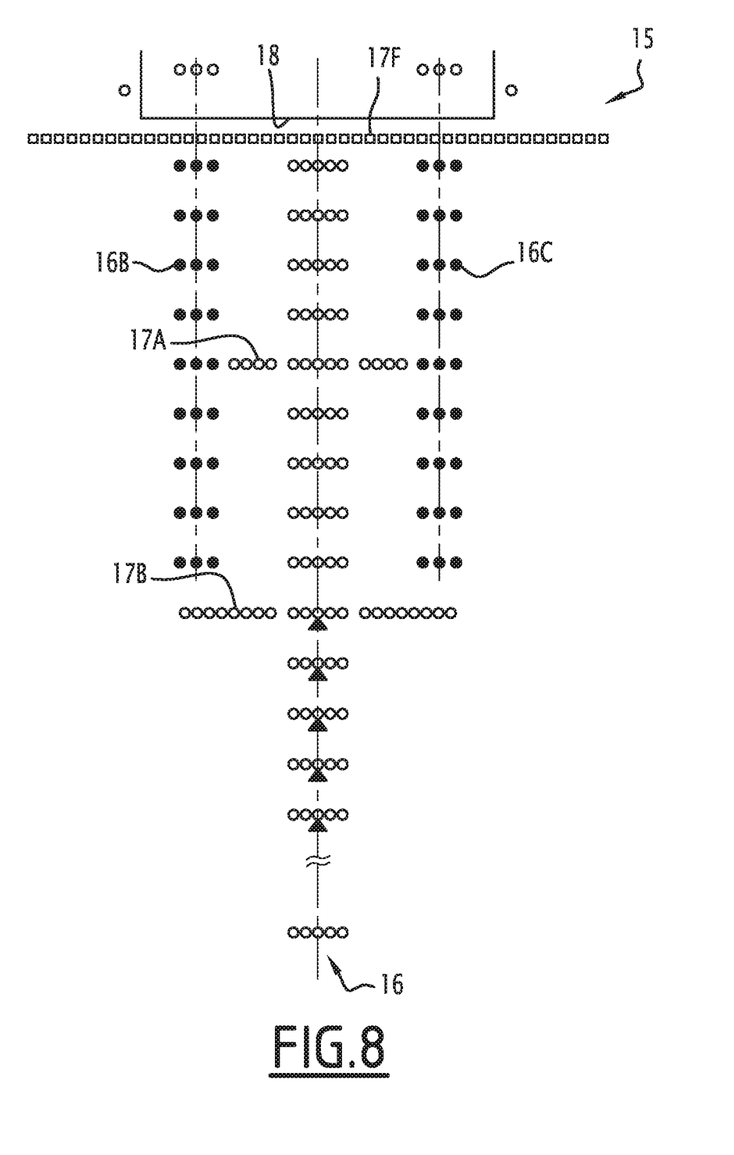

The ramp 15 shown in FIG. 8 differs from that shown in FIG. 7 by the presence of two longitudinal rows 16B, 16C as previously described, and one transverse row 17A situated between the rows 17B and 17F.

In reference to FIG. 2, the cockpit 14 is provided with a primary display system 22 connected to a central avionics unit 20.

The primary system 22 allows the crew to pilot the aircraft 12, manage navigation, and monitor and control the various operational systems present in the aircraft 12. The system 22 includes a dashboard provided with a plurality of base monitors 24A to 24D forming head down display units.

In this example, the cockpit 14 is also advantageously provided with at least one semitransparent head up display 26, placed across from the windshield, or even two semitransparent head up displays 26.

The cockpit 14 is also provided with a control member 28 for the piloting of the aircraft, such as a lever or control stick.

In a known manner, the base monitors 24A and 24C are for example primary display monitors intended to display flight parameters of the aircraft. The base monitors 24B and 24D are for example multifunctional navigation and/or monitoring and control monitors for the avionics systems.

The primary display system 22 is provided with a display-generating assembly able to display the different windows present on these monitors 24A to 24D.

The central avionics unit 20 is connected to a system 30 of sensors for measuring airplane and spatial positioning parameters of the aircraft 12.

The system 30 of measuring sensors for example includes sensors for measuring parameters outside the aircraft such as the temperature, pressure or speed, sensors for measuring parameters inside the aircraft and its various functional systems, and positioning sensors, such as geographical position sensors, in particular a GPS sensor, sensors for determining the slope of the aircraft, in particular at least one inertial unit, a sensor for determining a height with respect to the ground, in particular a radio altimeter.

The sensors of the system of measuring sensors 30 are able to provide information on the geographical position of the aircraft 12, its speed, its heading and its attitude (pitch altitude, roll angle).

In reference to FIG. 1, the display system 10 is connected to the measuring and positioning system 30.

The display system 10 includes at least one display unit 36, and a display generator in the form of an assembly 38 for generating a display on the display unit 36, connected to the display unit 36 and to the system of measuring sensors 30. The system 10 further includes a man/machine interface 40.

The display unit 36 is for example one of the monitors 24A to 24B and/or is a semitransparent head-up display 26 of the cockpit 14. In other alternatives, the display unit 36 is for example a project or system for projecting images on the windshield of the cockpit, a semitransparent sunshade, a helmet visor or a semitransparent glass close to the eye.

The display unit 36 allows the pilot to observe, by transparency, the area situated in front of the aircraft 12, and simultaneously, a display generated by the display-generating assembly 38.

In a first embodiment, which will be described below, the display unit 36 of the display system 10 is the semitransparent head-up display 26 of the cockpit 14.

The display-generating assembly 38 includes at least one processor 42 and at least one memory 44 containing a plurality of software modules capable of being executed by the processor 42. It includes a database 46 of landing strip characteristics, for example stored in the memory 44.

The display-generating assembly 38 includes a module 48 for recovering data from the measuring sensors of the system 30, in particular from the geographical position of the aircraft 12 relative to the ground.

Figure 3:
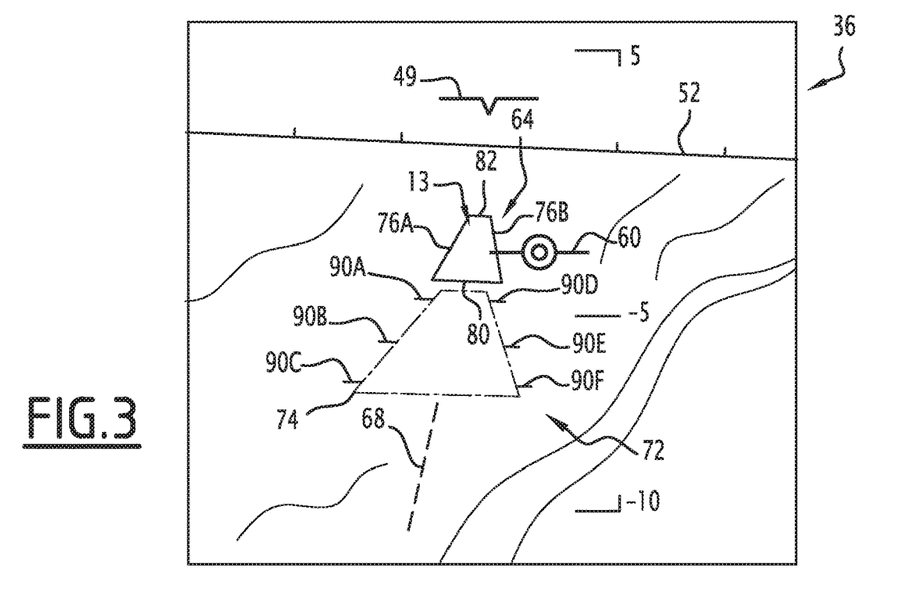
FIGS. 3 to 4 illustrate the display created by the display system during the approach of the aircraft toward a landing strip.

In reference to FIGS. 1 and 3, the display-generating assembly 38 includes a module 47 for generating a model symbol 49 of the aircraft, a module 50 for generating an artificial horizon line 52, and an associated module 54 for generating a slope scale 56.

The display-generating assembly 38 also comprises a module 58 for generating a speed vector symbol 60 and modules for generating other symbols representative of flight parameters, for example an altitude indicator, airspeed, vertical speed, ground speed, engine information, and lift configuration indicators of the aircraft.

The display-generating assembly 38 further comprises a module 62 for generating a localization marking 64 of the landing strip 13, and a module 66 for generating a runway axis symbol 68, the marking 64 and the symbol 68 being able to be displayed on approach to the landing strip 13, advantageously once the landing strip 13 has been selected by the pilot.

According to the embodiment of the invention shown in FIG. 1, the display-generating assembly 38 also includes a module 70 for generating a localization marking 72 for a presence zone 74 of the approach light ramp 15 toward the landing strip 13.

The generating module 47 is able to create the display of an airplane model symbol 49 that embodies an infinite projection of the longitudinal axis of the aircraft 12, from data received from the sensors of the positioning system 30.

The generating module 50 is able to determine, from data received from the sensors of the positioning system 30, the position of the artificial horizon line 52 relative to the current attitude of the aircraft. This horizon line 52 is straight when the aircraft 12 travels the wings level, and becomes inclined based on the lateral attitude of the aircraft 12.

The module 58 is able to create the display of a speed vector symbol 60 indicating the direction of the speed vector of the aircraft 12, based on data received from the sensors of the measuring system 30. The vertical deviation between the artificial horizon line 52, away from the deformed region 70, represents the ground slope of the aircraft 12.

The generating module 54 is able to display a slope scale 56 situated on either side of the speed vector symbol 60 and embodied by graduations illustrating successive degrees of slope.

The generating module 62 is able to create least one runway localization marking 64 embodying the geographical position of the landing strip 13, during an approach phase for landing, when the landing strip 13 may be visible in front of the aircraft 12.

This display can be done when the pilot has selected the targeted landing strip. It is for example displayed when the aircraft 12 is at a height below 365 m (1200 feet) and at a distance smaller than 9.3 km (5 nautical miles) from the threshold 18 of the landing strip 13.

The runway localization marking 64 comprises at least two left and right lateral localization symbols 76A, 76B of the position of the landing strips 13, the position of which is determined from geographical coordinates of the runway 13 contained in the database 46.

These symbols 76A, 76B are for example two converging lines positioned locally on the display unit 36, correspond to geographical lines 78A, 78B parallel to the axis of the landing strips 13 on the ground (see FIG. 5), situated along the edges of the landing strips 13 or at a predefined distance therefrom, as obtained from the database 46.

The length of the geographical lines 78A, 78B, and subsequently, the length on the display unit 36 of the symbol 76A, 76B, corresponds to the geographical length of the landing strips 13, as obtained from the database 46.

Optionally, the runway localization marking 64 further comprises a localization symbol 80 for the runway threshold and a symbol 82 for the end-of-runway localization, respectively formed by lines connecting the longitudinal ends of the symbols 76A, 76B.

The generating module 66 is able to display a symbol 68 illustrating the direction on the display unit 36 of the runway axis A-A', for example a dotted line, below and away from the position corresponding to the runway threshold 18 on the display unit 36.

The presence zone 74 on the display unit 36 corresponds to a predefined geographical zone 88 on the ground, embodied in FIG. 5. The geographical zone 88 contains at least 50%, preferably all of the approach light ramp 15.

The geographical zone 88 is for example a trapezoid with axis A-A', with its apex situated at the runway threshold 18. The opening angle α of the trapezoid, taken from a targeted touchdown point 89, is defined so that the width of the geographical zone 88, taken between 274 m (900 feet) entry and 335 m (1100 feet) from the threshold of the runway 18, is greater than the maximum width of a transverse row 17B situated at that distance, with a display precision margin.

The display precision margin is determined as a function of the positioning imprecision of the runway, the imprecision of the data from the airplane sensors (position of the aircraft and attitude, in particular heading), and the imprecision on the targeted direction through the display unit 36.

This margin is chosen to ensure that the transverse row 17B remains comprised in the geographical zone 88, even when errors are present.

Typically, for errors creating a shift of 0.5° in heading between the calculated axis of the runway and the real axis, the margin is approximately 15 m on each side, or 30 m.

The width of the geographical zone at the transverse row 17B is preferably greater than 60 m and comprised between 60 m and 100 m.

The touchdown point 89 is generally situated at approximately 300 m (1000 feet) in front of the runway threshold 18.

Such a geographical zone 88 fully contains most of the existing approach ramp 15.

The localization marking 72 on the display unit 36 includes at least one symbol 90A to 90F for lateral localization of the presence zone 74.

In this example, the localization marking 72 includes at least one symbol 90A to 90C for left lateral localization of the presence zone 74 and at least one symbol 90D to 90F for the right lateral localization of the presence zone 74.

Each symbol 90A to 90F is formed here by a horizontal dash.

The localization marking 72 here comprises a first series of left lateral localization symbols 90A to 90C spaced longitudinally apart from one another and a second series of right lateral localization symbols 90D to 90E spaced longitudinally apart from one another.

The left lateral localization symbols 90A to 90C and the right lateral localization symbols 90D to 90E converge toward the runway axis AA-A' while coming closer to the landing strip 13.

The position of each lateral localization symbol 90A to 90F on the monitor respectively corresponds to a geographical point 92E to 92F on the sides of the geographical zone 88, situated at a predetermined distance D1 to D3 from the runway threshold 18.

Advantageously, at least one geographical point 92A situated to the left of the geographical zone 88 and one geographical point 92D situated to the right of the geographical zone are placed at a distance from the runway threshold 18 corresponding to the presence of a transverse row 17B of lights.

Thus, the lateral localization symbols 90A and 90D created by the module 70 and respectively corresponding to the geographical points 92A, 92D are capable of being displayed on the display unit 36 on both sides of the position where the transverse row of lights 17B will appear.

Preferably, the lateral localization symbols 90A and 90D respectively correspond to a geographical point 92A situated to the left of the geographical zone 88 and a geographical point 92D situated to the right of the geographical zone 88, which are placed at an axial distance D1 from the runway threshold, considered along the axis A-A' comprised between 274 m (900 feet) and 335 m (1100 feet), to correspond to a transverse row of lights 17B present on most existing approach light ramps 15.

The geographical distance transversely separating the geographical points 92A, 92D is then comprised between 30 m and 100 m with the display precision margin described above.

In the example illustrated in FIG. 3, at least two left and right lateral localization symbols 90C, 90F respectively correspond to a geographical point 92C situated to the left of the geographical zone 88 and to a geographical point 92F situated to the right of the geographical zone 88 that are placed at an axial distance D3 from the runway threshold, taken along the axis A-A', greater than 610 m (2000 feet), and generally comprised between 610 m and 1067 m (3500 feet) to correspond substantially to the axial end of the row 16, and thus to substantially encompass the entire ramp 15.

Furthermore, two left and right lateral localization symbols 90B and 90E respectively correspond to a geographical point 92B situated to the left of the geographical zone 88 and to at least one geographical point 92E situated to the right of the geographical zone 88 that are placed at an axial distance D2 from the runway threshold, considered along the axis A-A', comprised between the axial distance D1 and the axial distance D3, for example at a distance substantially equal to 6 cm (2000 feet).

The definition of the geographical zone 88 thus obtained and its definition by the predefined geographical points 92A to 92F creates localization symbols 90A to 90F that define the localization zone 76 precisely enough on the display unit 36 to encompass most of the structures of existing approach ramps 15 that must be viewed by the pilot.

Furthermore, the symbol 68 illustrating the direction of the runway axis A-A' is placed by the generating module 66 below the presence zone 74, vertically below the symbols 90A to 90F, so as not to interfere with the presence zone 74.

The operation of the display system 10 according to an embodiment of the invention, during the approach toward a landing strip 13, will now be described in reference to FIGS. 3 to 4.

Initially, the aircraft 12 descends toward the landing strip 13. As illustrated by FIG. 3, the generating module 50 encompasses the display of the horizon line 52. The generating module 54 creates the display of a slope scale 56 and the generating module 58 creates the display of a speed vector symbol 60 whereof the vertical distance from the horizon line 52 reflects the airplane slope, on the slope scale 56.

At a given distance from the landing strip 13, the pilot selects the chosen landing strip 13. When the distance is smaller than a given display distance, for example 9.6 km (5 nautical miles), and/or a given display height, for example 365 m (1200 feet), the generating module 62 activates the display of the runway localization marking 64. It queries the database 46 to determine the geographical location of the rows 78A, 78B and transcribes this geographical position into a corresponding position on the display unit 36 to display the lateral rows 76A, 76B.

The generating module 66 determines the geographical position of the runway axis A-A' and calculates the position on the screen, accordingly, of the runway axis symbol 68, in the extension of the runway localization marking 64, away from and below the latter.

The generating module 70 then activates the localization marking 72 of the presence zone 74.

In the example illustrated in FIGS. 3 and 5, the generating module 70 calculates, in real-time, the geographical position of the geographical zone 88 from the geographical position of the runway threshold 18, the position of the targeted touchdown point 89 and the width of the geographical zone 88 at a given distance from the runway threshold 18, for example comprised between 274 m (900 feet) and 335 m (1100 feet) from the runway threshold 18 along the axis A-A'.

It then determines the geographical position of the geographical points 92A to 92F from the axial position of the runway threshold 18 on the runway axis A-A' and the predetermined distances D1 to D3.

It transcribes this geographical position in real-time into a position on the display unit 36 and displays each localization symbol 90A to 90F on the display unit 36 in a position corresponding to the geographical position 92A to 92F. The presence zone 74 of the approach light ramp 15 is therefore physically defined on the display unit 36 while being laterally defined by the symbols 90A to 90F.

In the example illustrated in FIG. 3, the cloud cover conceals the approach ramp 15. The pilot may nevertheless anticipate, in real-time, where the approach light ramp 15 will appear and focus his search only on a small zone 74 on the display unit 36 while being guided toward that zone 74 by the presence of the localization marking 72.

In particular, the pilot may view an approach map associated with the landing strip 13 to determine the type of ramp associated with the targeted landing strip 13. He may anticipate that a transverse row 17B of lights will appear between the localization symbols 90A, 90D, and that the rest of the approach light ramp 15 will be situated longitudinally between the symbols 90A to 90C on one side and between the symbols 90D to 90F on another side.

Figure 4:
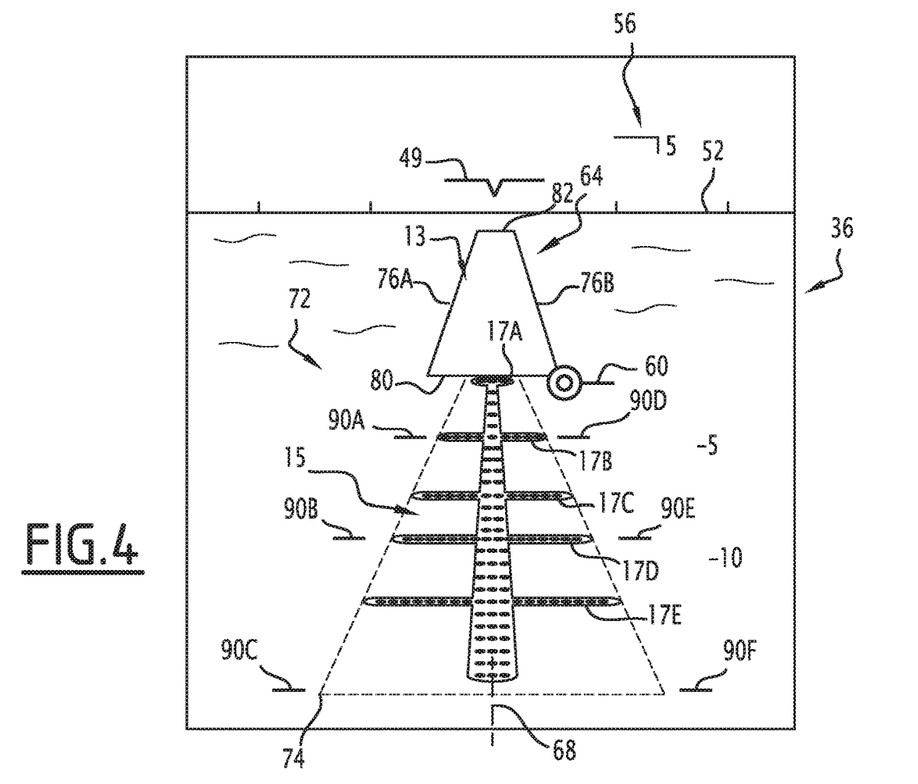

This is illustrated by FIG. 4: once the cloud cover has been pierced, the approach light ramp 15 appears in the presence zone 74 inside the localization marking 72.

The presence of the localization marking 72 therefore greatly simplifies the pilot's task and decreases his workload, since he knows precisely where to look for the approach ramp 15 in front of the aircraft 12, in order to decide whether to land on the landing strip 13.

In one alternative, the lateral localization symbols 90A to 90F are not formed by horizontal dashes, but by other symbols such as vertical dashes, crosses, or geometric shapes such as polygons.

In another alternative, the localization marking 72 comprises, to replace or in addition to the discrete lateral localization symbols 90A to 90F previously described, lateral localization symbols formed by lateral localization lines, the position of which on the monitor corresponds to the lateral positions of the geographical zone 88 visible in FIG. 5.

Figure 10:
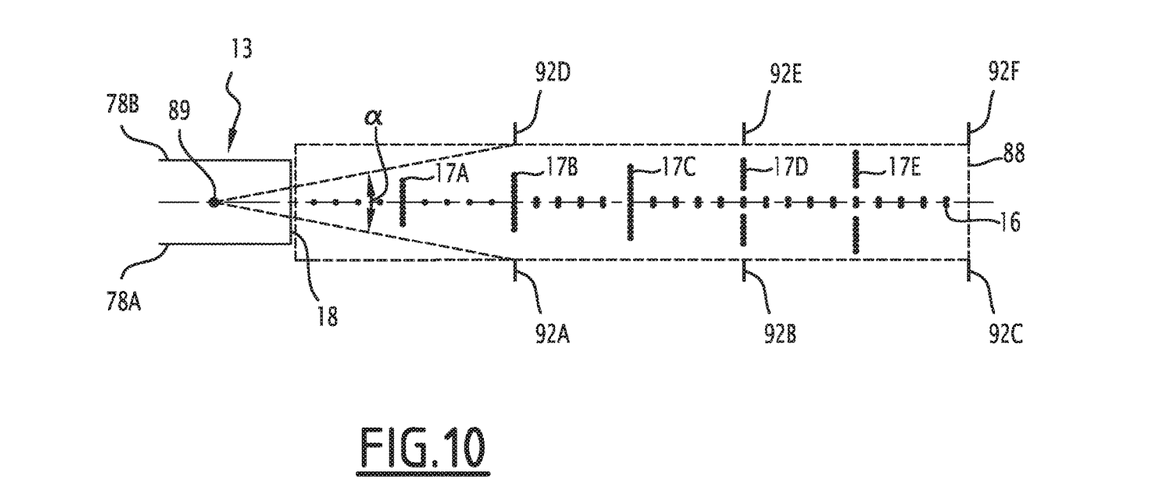
FIG. 10 is a view similar to FIG. 5 illustrating an alternative geographical zone containing the approach ramp.

In another alternative shown in FIG. 10, the geographical zone 88 does not have a trapezoidal shape, but has another polygonal shape, in particular a rectangle shape with lines parallel to the runway 13 or a shape with curved edges. The display of the lateral localization symbols 90A to 90F is then modified to correspond to the edges of the geographical zone 88.

Figure 9:
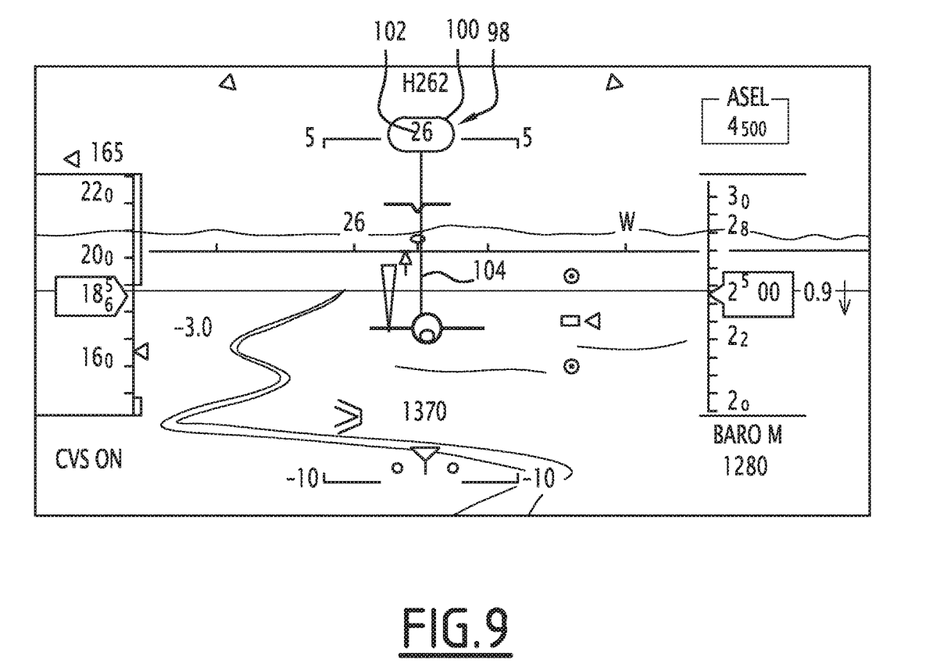
FIG. 9 illustrates the display created by an alternative display system, before the approach of the aircraft toward the landing strip.

In an alternative illustrated by FIG. 1 (dotted lines) and by FIG. 9, the display-generating assembly 38 includes a module 96 for generating a symbol 98 for identifying the landing strip 13, pointing to the position of the landing strip 13, capable of creating and displaying the symbol 98 before the display of the runway localization marking 64 and the localization marking 72 of the presence zone 74 of an approach ramp 15.

In reference to FIG. 9, the identification symbol of the landing strip 13 for example includes a box 100 containing a piece of information 102 identifying the landing strip 13 and a line 104 pointing to the position of the landing strip 13 from the box 100.

The identification information 102 of the landing strip 13 is for example the number of the landing strip, obtained from the database 46 of landing strips 13.

During operation, the generating module 96 is able to activate the display of the symbol 98, preferably when the dimensions of the landing strip 13 on the display unit 36 are too small to display the runway localization marking 64.

In one alternative, the display system 10 includes a database 200 of approach ramps 15, advantageously contained in the memory 44, containing information relative to the characteristics of the ramps associated with each landing strip 13 on which the aircraft 12 may land.

The information is for example a maximum length of the ramp 15, in particular of its longitudinal line(s) 16, the position and/or width of the or each transverse row 17A to 17E, etc.

The generating module 70 is then able to query the database 200 upon approaching a given runway 13 to calculate the dimensions of the geographical zone 88 and the geographical positions 92A to 92F corresponding to each definition symbol 90A to 90F needing to be displayed as a function of at least one piece of information characteristic of the approach ramp 15 coming from the database 200.

In particular, the generating module 70 is able to determine the position of the points 92C, 92F corresponding to the axial end of the row 16, and from the length of the ramp 15 loaded in the database 200.

In another alternative, the display unit 36 is a head down monitor connected to an optical sensor making it possible to observe the area in front of the aircraft 12.

In one alternative, the system 10 does not necessarily display a horizon line and/or a slope scale, but only the localization marking 72.

What is claimed is:

1. A display system of an aircraft, comprising:
   a display unit; and
   a display generator for generating a display on the display unit, the display generator being configured to calculate a position of a localization marking on the display unit based on a predetermined relationship of the localization marking with respect to a geographical position of an approach light ramp toward a landing strip and to display, on approach to the landing strip, the localization marking at the calculated position on the display unit, the display unit being configured to allow a pilot to observe an area situated in front of the aircraft and simultaneously the localization marking generated by the display generator on the display unit, the localization marking being displayed on the display unit in the predetermined relationship with respect to the geographical position of the approach light ramp to define, in low visibility conditions, where the approach light ramp will appear on the display unit and to guide a pilot where the approach light ramp will appear on the display unit.

2. The system according to claim 1 wherein the localization marking includes at least one lateral localization symbol of where the approach light ramp will appear on the display unit.

3. The system according to claim 2 wherein the localization marking includes at least two opposite lateral localization symbols of where the approach light ramp will appear on the display unit, delimiting where the approach light ramp will appear on the display unit to the left and right.

4. The system according to claim 2 wherein the localization marking includes at least one series of lateral localization symbols on one side of where the approach light ramp will appear on the display unit, the series of lateral localization symbols converging toward a longitudinal axis of the runway.

5. The system according to claim 4 wherein the localization marking includes two series of lateral localization symbols respectively delimiting the left side and right side of where the approach light ramp will appear on the display unit.

6. The system according to claim 1 wherein the localization marking includes at least one symbol identifying, on the display unit, a position corresponding to a predetermined distance on the ground from the runway threshold at which the approach light ramp comprises a transverse row of lights.

7. The system according to claim 6 wherein the predetermined distance on the ground is comprised between 275 meters and 335 meters.

8. The system according to claim 6 wherein the localization marking comprises two opposite symbols situated in the position corresponding to a predetermined distance on the ground from the runway threshold at which the approach light ramp comprises a transverse row of lights, the lateral separation between the opposite symbols corresponding to a distance on the ground strictly greater than a width of the transverse row.

9. The system according to claim 1 wherein the display generator is configured to display a position marking of the landing strip, situated above the localization marking of where the approach light ramp will appear on the display unit toward the landing strip.

10. The system according to claim 1, wherein the display generator is configured to display a runway axis symbol, situated below the localization marking of where the approach light ramp will appear on the display unit toward the landing strip.

11. The system according to claim 1 further comprising a database of approach ramps, containing at least one piece of information characteristic of each approach ramp associated with a landing strip targeted by the aircraft, the display generator being configured to create and display the localization marking by using the at least one piece of information characteristic of the approach ramp approached by the aircraft contained in the database of approach ramps.

12. The system according to claim 1 wherein the display generator is configured to dynamically display, on the display unit, at least one horizon line and a slope scale relative to the horizon line.

13. The system according to claim 1 wherein the display generator is configured to display, before the display of the localization marking of where the approach light ramp will appear on the display unit toward the landing strip, an identification symbol of the landing strip, pointing to a position of the landing strip on the display unit.

14. The system according to claim 1 wherein the display unit is an at least partially transparent display unit, a projector for projecting images on the windshield of the cockpit, a semitransparent sunshade, a helmet visor, or a semitransparent glass close to the eye.

15. The system according to claim 14 wherein the at least partially transparent display unit is a semitransparent screen placed in front of a windshield of the cockpit.

16. A display method in an aircraft comprising:
providing the system according to claim 1;
upon approaching the landing strip, displaying, via the display generator, of the localization marking of where the approach light ramp will appear on the display unit toward the landing strip.

17. The system according to claim 1 wherein the display generator is configured to calculate the predetermined relationship of the localization marking with respect to the geographical position of the approach light ramp by calculating, in real-time, a geographical position of a geographical zone on the ground, the geographical zone containing at least 50% of the approach light ramp.

18. A display system of an aircraft, comprising:
a display unit; and
a display generator for generating a display on the display unit, the display generator being configured to calculate a position of a localization marking on the display unit based on a predetermined relationship of the localization marking with respect to a geographical position of an approach light ramp toward a landing strip and to display, on approach to the landing strip, the localization marking at the calculated position, the display unit configured to allow a pilot to observe an area situated in front of the aircraft and simultaneously the localization marking generated by the display generator, the localization marking being displayed on the display unit in the predetermined relationship with respect to the geographical position of the approach light ramp and to guide a pilot where the approach light ramp will appear on the display unit,
wherein the localization marking includes at least one symbol identifying, on the display unit, a position corresponding to a predetermined distance on the ground from the runway threshold at which the approach light ramp comprises a transverse row of lights.

19. A display system of an aircraft, comprising:
a display unit; and
a display generator for generating a display on the display unit, the display generator being configured to calculate a position of a localization marking on the display unit based on a predetermined relationship of the localization marking with respect to a geographical position of an approach light ramp toward a landing strip and to display, on approach to the landing strip, the localization marking at the calculated position, the display unit configured to allow a pilot to observe an area situated in front of the aircraft and simultaneously the localization marking generated by the display generator, the localization marking being displayed on the display unit in the predetermined relationship with respect to the geographical position of the approach light ramp to guide a pilot, when the approach ramp is concealed, as to where the approach light ramp will appear on the display unit when the approach ramp is visible.

* * * * *